United States Patent
Chu et al.

(10) Patent No.: US 6,744,590 B2
(45) Date of Patent: Jun. 1, 2004

(54) SEEK TRAJECTORY ADAPTATION IN SINUSOIDAL SEEK SERVO HARD DISK DRIVES

(75) Inventors: Sang Hoon Chu, Santa Clara, CA (US); Ju Il Lee, San Jose, CA (US); Jun Seok Shim, Cupertino, CA (US); Won Goo Kim, San Jose, CA (US)

(73) Assignee: Samsung Electronics Co., Inc. (KR)

( * ) Notice: Subject to any disclaimer, the term of this patent is extended or adjusted under 35 U.S.C. 154(b) by 205 days.

(21) Appl. No.: 09/859,836

(22) Filed: May 16, 2001

(65) Prior Publication Data

US 2002/0054450 A1 May 9, 2002

Related U.S. Application Data

(60) Provisional application No. 60/232,647, filed on Sep. 14, 2000.

(51) Int. Cl.[7] ................................................ G11B 5/596
(52) U.S. Cl. ............................ 360/78.06; 360/78.07; 318/561
(58) Field of Search ....................... 360/78.06, 78.07, 360/78.04; 318/561

(56) References Cited

U.S. PATENT DOCUMENTS

| 4,371,902 A | 2/1983 | Baxter et al. |
| 4,539,662 A | 9/1985 | Hatano et al. |
| 4,591,933 A | 5/1986 | Quackenbush |
| 4,616,276 A | 10/1986 | Workman |
| 4,677,568 A | 6/1987 | Arbter |
| 4,802,033 A | 1/1989 | Chi |
| 4,811,135 A | 3/1989 | Janz |
| 4,823,212 A | 4/1989 | Knowles et al. |
| 4,890,172 A | 12/1989 | Watt et al. |
| 4,937,689 A | 6/1990 | Seaver et al. |
| 4,977,472 A | 12/1990 | Volz et al. |
| 4,979,056 A | 12/1990 | Squires et al. |
| 4,982,295 A | 1/1991 | Yakuwa et al. |
| 5,036,408 A | 7/1991 | Leis et al. |
| 5,050,146 A | 9/1991 | Richgels et al. |

(List continued on next page.)

FOREIGN PATENT DOCUMENTS

| EP | 0 263 962 A2 | 4/1988 |
| EP | 0353897 A2 | 2/1990 |
| EP | 0 441 407 A1 | 8/1991 |
| EP | 0 543 654 A2 | 5/1993 |
| EP | 0 601 855 A2 | 6/1994 |
| EP | 0 663 766 A1 | 7/1995 |
| EP | 0717399 A2 | 6/1996 |
| EP | 0 717 559 A2 | 6/1996 |
| EP | 0 718 827 A2 | 6/1996 |
| GB | 2 285 165 A | 6/1995 |

(List continued on next page.)

*Primary Examiner*—David Hudspeth
*Assistant Examiner*—Mitchell Slavitt
(74) *Attorney, Agent, or Firm*—Irell & Manella LLP; Jeffrey P. Aiello

(57) ABSTRACT

A method, apparatus, and computer program product for a hard disk drive servomechanism. In one embodiment, the apparatus comprises a disk which has a surface, a spindle motor that rotates the disk, a transducer which can write information onto the disk and read information from the disk, and an actuator arm that can move the transducer across the surface of the disk. The apparatus further includes a controller. The controller can determine a seek length from a first track to a second track, determine a seek time based on the seek length, scale the seek time in response to a velocity error between a calculated velocity and a design velocity for the seek length, and control the actuator arm to move the transducer across the disk surface from the first track to the second track using an acceleration trajectory.

39 Claims, 6 Drawing Sheets

U.S. PATENT DOCUMENTS

| | | | |
|---|---|---|---|
| 5,053,899 | A | 10/1991 | Okawa et al. |
| 5,111,349 | A | 5/1992 | Moon |
| 5,182,684 | A | 1/1993 | Thomas et al. |
| 5,210,662 | A | 5/1993 | Nishijima |
| 5,235,478 | A | 8/1993 | Hoshimi et al. |
| 5,255,136 | A | 10/1993 | Machado et al. |
| 5,291,110 | A | 3/1994 | Andrews, Jr. et al. |
| 5,333,140 | A | 7/1994 | Moraru et al. |
| 5,408,367 | A | 4/1995 | Emo |
| 5,448,429 | A | 9/1995 | Cribbs et al. |
| 5,450,249 | A | 9/1995 | Nagaraj et al. |
| 5,452,285 | A | 9/1995 | Monen |
| 5,453,887 | A | 9/1995 | Negishi et al. |
| 5,465,034 | A | 11/1995 | Andrews, Jr. et al. |
| 5,465,035 | A | 11/1995 | Scaramuzzo, Jr. et al. |
| 5,475,545 | A | 12/1995 | Hampshire et al. |
| 5,500,776 | A | 3/1996 | Smith |
| 5,523,902 | A | 6/1996 | Pederson |
| 5,570,247 | A | 10/1996 | Brown et al. |
| 5,581,420 | A | 12/1996 | Chainer et al. |
| 5,583,712 | A | 12/1996 | Brunelle |
| 5,587,850 | A | 12/1996 | Ton-that |
| 5,600,506 | A | 2/1997 | Baum et al. |
| 5,606,469 | A | 2/1997 | Kosugi et al. |
| 5,608,587 | A | 3/1997 | Smith |
| 5,615,058 | A | 3/1997 | Chainer et al. |
| 5,631,783 | A | 5/1997 | Park |
| 5,640,423 | A | 6/1997 | Archer |
| 5,657,179 | A | 8/1997 | McKenzie |
| 5,659,436 | A | 8/1997 | Yarmchuk et al. |
| 5,666,238 | A | 9/1997 | Igari et al. |
| 5,666,242 | A | 9/1997 | Edwards et al. |
| 5,677,609 | A | 10/1997 | Khan et al. |
| 5,680,270 | A | 10/1997 | Nakamura |
| 5,680,451 | A | 10/1997 | Betts et al. |
| 5,691,857 | A | 11/1997 | Fitzpatrick et al. |
| 5,696,647 | A | 12/1997 | Phan et al. |
| 5,710,677 | A | 1/1998 | Teng et al. |
| 5,715,105 | A | 2/1998 | Katayama et al. |
| 5,734,680 | A | 3/1998 | Moore et al. |
| 5,748,677 | A | 5/1998 | Kumar |
| 5,751,513 | A | 5/1998 | Phan et al. |
| 5,760,992 | A | 6/1998 | Phan et al. |
| 5,771,126 | A | 6/1998 | Choi |
| 5,771,130 | A | 6/1998 | Baker |
| 5,771,131 | A | 6/1998 | Pirzadeh |
| 5,796,543 | A | 8/1998 | Ton-That |
| 5,798,883 | A | 8/1998 | Kim |
| 5,867,337 | A | 2/1999 | Shimomura |
| 5,867,353 | A | 2/1999 | Valent |
| 5,892,634 | A | 4/1999 | Ito et al. |
| 5,901,009 | A | 5/1999 | Sri-Jayantha et al. |
| 5,914,829 | A | 6/1999 | Kadlec et al. |
| 5,917,670 | A | 6/1999 | Scaramuzzo et al. |
| 5,930,067 | A | 7/1999 | Andrews et al. |
| 5,936,792 | A | 8/1999 | Kobayashi et al. |
| 5,946,157 | A | 8/1999 | Codilian et al. |
| 5,946,158 | A | 8/1999 | Nazarian et al. |
| 5,949,605 | A | 9/1999 | Lee et al. |
| 5,959,952 | A | 9/1999 | Wakuda |
| 6,118,616 | A | 9/2000 | Jeong |
| 6,140,791 | A | 10/2000 | Zhang |
| 6,178,060 | B1 | 1/2001 | Liu |
| 6,225,767 | B1 | 5/2001 | Lovett et al. |
| 6,369,974 | B1 | 4/2002 | Asgari et al. |
| 6,441,988 | B2 * | 8/2002 | Kang et al. ............... 360/78.06 |
| 6,549,364 | B1 * | 4/2003 | Shih |
| 6,570,733 | B1 * | 5/2003 | Waugh et al. ............ 360/78.06 |

FOREIGN PATENT DOCUMENTS

| | | |
|---|---|---|
| GB | 2 307 089 A | 5/1997 |
| GB | 2 308 488 A | 6/1997 |
| GB | 2342492 A | 4/2000 |
| GB | 2 342 492 A | 4/2000 |
| JP | 10208418 | 8/1998 |
| WO | WO 93/09480 | 5/1993 |
| WO | WO 95/24035 | 9/1995 |
| WO | WO 96/23305 | 8/1996 |

* cited by examiner

SEEK TRAJECTORY ADAPTATION IN SINUSOIDAL SEEK SERVO HARD DISK DRIVES

CROSS-REFERENCE TO RELATED APPLICATION

The present application is a non-provisional application of a provisional application entitled "SEEK TRAJECTORY ADAPTATION IN SINUSOIDAL SEEK SERVO OF HARD DISK DRIVES", assigned Provisional Application Serial No. 60/232,647, and filed Sep. 14, 2000.

BACKGROUND OF THE INVENTION

1. Field of the Invention

The present invention relates generally to disk drives and more particularly to a method, apparatus, and computer readable program product for improving the performance of hard disk drive servomechanisms.

2. Description of the Related Art

Hard disk drives include a plurality of magnetic transducers that can write and read information by magnetizing and sensing the magnetic field of a rotating disk(s), respectively. The information is typically formatted into a plurality of sectors that are located within an annular track. There are a number of tracks located across each surface of the disk. A number of vertically similar tracks are sometimes referred to as a cylinder. Each track may therefore be identified by a cylinder number.

Each transducer is typically integrated into a slider that is incorporated into a head gimbal assembly (HGA). Each HGA is attached to an actuator arm. The actuator arm has a voice coil located adjacent to a magnet assembly which together define a voice coil motor. The hard disk drive typically includes a driver circuit and a controller that provide current to excite the voice coil motor. The excited voice coil motor rotates the actuator arm and moves the transducers across the surfaces of the disk(s).

When writing or reading information, the hard disk drive may perform a seek routine to move the transducers from one cylinder (track) to another cylinder. During the seek routine the voice coil motor is excited with a current to move the transducers to the new cylinder location on the disk surfaces. The controller also performs a servo routine to insure that the transducer is at the center of the track.

The assignee of the present invention has introduced disk drives that utilize a sinusoidal seek algorithm where the transducer is moved according to a sinusoidal trajectory.

BRIEF SUMMARY OF THE INVENTION

The present invention comprises a method, apparatus, and computer program product for a hard disk drive. In one embodiment, the apparatus comprises a disk which has a surface, a spindle motor to rotate the disk, a transducer to write information onto the disk and read information from the disk, an actuator arm to move the transducer across the surface of the disk, and a controller. The controller, in response to a command to seek from a first track to a second track, can determine a seek length from the first track to the second track, determine a seek time based on the seek length, scale the seek time in response to a velocity error between a calculated velocity and a design velocity for the seek length, and control the actuator arm to move said transducer across said disk surface from the first track to the second track using an acceleration trajectory.

DETAILED DESCRIPTION OF THE INVENTION

The present invention comprises a method, apparatus, and computer program product for a hard disk drive. In one embodiment, a hard disk drive includes a disk which has a surface, a spindle motor that rotates the disk, and a transducer which can write information onto the disk and read information from the disk. The transducer may be integrated into a slider that is incorporated into a head gimbal assembly (HGA). The HGA may be mounted to an actuator arm which can move the transducer across the disk surface. The movement of the actuator arm and the transducer may be controlled by a controller.

The controller may move the transducer from a present track to a new track in accordance with a seek routine and a servo control routine. During the seek routine, the controller can determine a seek length from the first track to the second track, determine a seek time based on the seek length, adjust the seek time in response to a velocity error between a calculated velocity and a design velocity for the seek length, and control the actuator arm to move the transducer across the disk surface from the present track to the new track using the acceleration trajectory. In one embodiment, the acceleration trajectory is a sinusoidal acceleration trajectory. The acceleration trajectory may take other forms such as a bang-bang acceleration trajectory.

Figure 1:
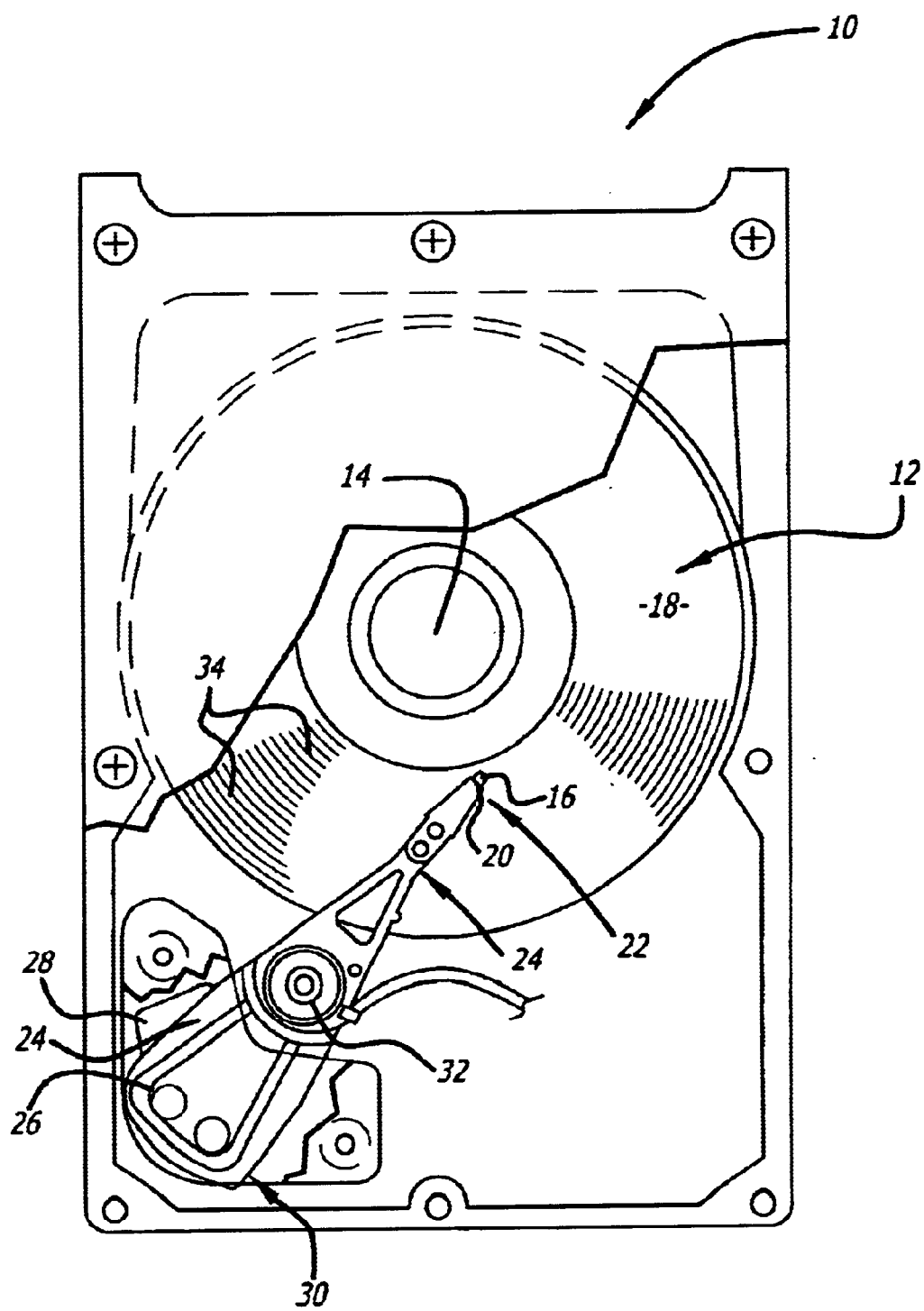
FIG. 1 is a top view of an embodiment of a hard disk drive of the present invention.

Referring to the drawings more particularly by reference numbers, FIG. 1 shows an embodiment of a hard disk drive 10. The drive 10 includes at least one magnetic disk 12 that is rotated by a spindle motor 14. The drive 10 may also include a transducer 16 located adjacent to a disk surface 18.

The transducer 16 can write and read information on the rotating disk 12 by magnetizing and sensing the magnetic field of the disk 12, respectively. There is typically a transducer 16 associated with each disk surface 18. Although a single transducer 16 is shown and described, it is to be understood that there may be a write transducer for magnetizing the disk 12 and a separate read transducer for sensing the magnetic field of the disk 12. The read transducer may be constructed from a magneto-resistive (MR) material.

The transducer 16 can be integrated into a slider 20. The slider 20 may be constructed to create an air bearing between the transducer 16 and the disk surface 18. The slider 20 may be incorporated into a head gimbal assembly (HGA) 22. The HGA 22 may be attached to an actuator arm 24 which has a voice coil 26. The voice coil 26 may be located adjacent to a magnet assembly 28 to define a voice coil motor (VCM)

30. Providing a current to the voice coil 26 will generate a torque that rotates the actuator arm 24 about a bearing assembly 32. Rotation of the actuator arm 24 will move the transducer 16 across the disk surface 18.

Information is typically stored within annular tracks 34 of the disk 12. Each track 34 typically contains a plurality of sectors. Each sector may include a data field and an identification field. The identification field may contain Gray code information which identifies the sector and track (cylinder). The transducer 16 is moved across the disk surface 18 to write or read information on a different track. Moving the transducer to access a different track is commonly referred to as a seek routine.

Figure 2:
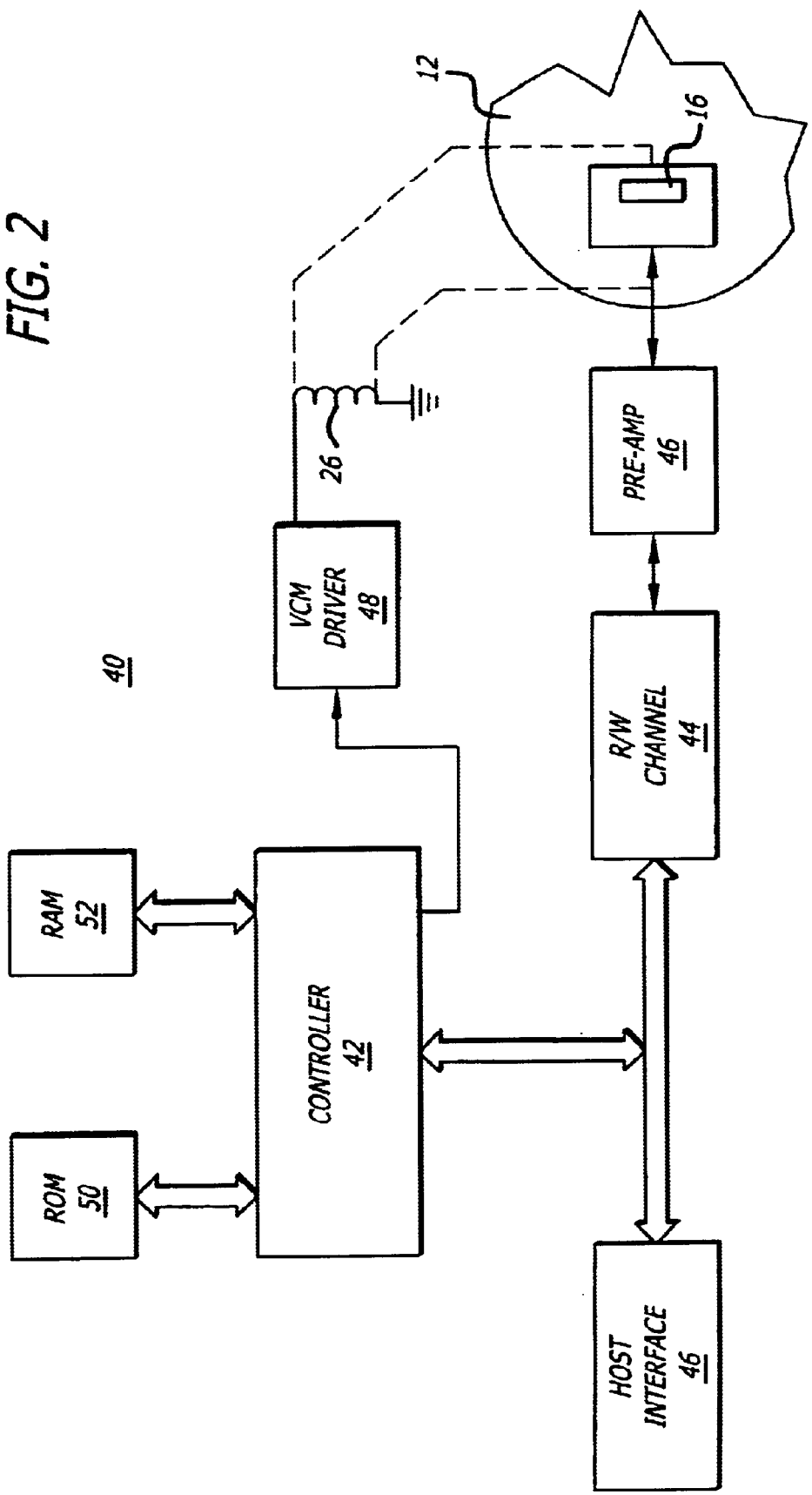
FIG. 2 is a schematic of an electrical system which controls the hard disk drive.

FIG. 2 shows an electrical system 40 which can control the hard disk drive 10. The system 40 may include a controller 42 that is coupled to the transducer 16 by a read/write (R/W) channel circuit 44 and a pre-amplifier circuit 46. The controller 42 may be a digital signal processor (DSP), microprocessor, microcontroller, and the like. The controller 42 can provide control signals to the read/write channel 44 to read from the disk 12 or write information to the disk 12. The information is typically transferred from the R/W channel 44 to a host interface circuit 46. The host circuit 46 may include buffer memory and control circuitry which allow the disk drive to interface with a system such as a personal computer.

The controller 42 may also be coupled to a VCM driver circuit 48 which provides a driving current to the voice coil 26. The controller 42 may provide control signals to the driver circuit 48 to control the excitation of the VCM and the movement of the transducer 16.

The controller 42 may be connected to a non-volatile memory such as a read only memory (ROM) or flash memory device 50, and a random access memory (RAM) device 52. The memory devices 50 and 52 may contain instructions and data that are used by the controller 42 to perform software routines. One of the software routines may be a seek routine to move the transducer 16 from one track to another track. The seek routine may include a servo control routine to insure that the transducer 16 moves to the correct track. In one embodiment, the memory device 50 contains the acceleration, velocity, and position trajectory equations, as discussed hereinbelow, where such equations may be loaded into memory device 52 at startup. Moreover the memory device 50 may include one or more software routines that allow(s) for adaptation of the seek trajectory and one or more tables, all of which may be loaded into the memory device 52 at startup.

Figure 3:
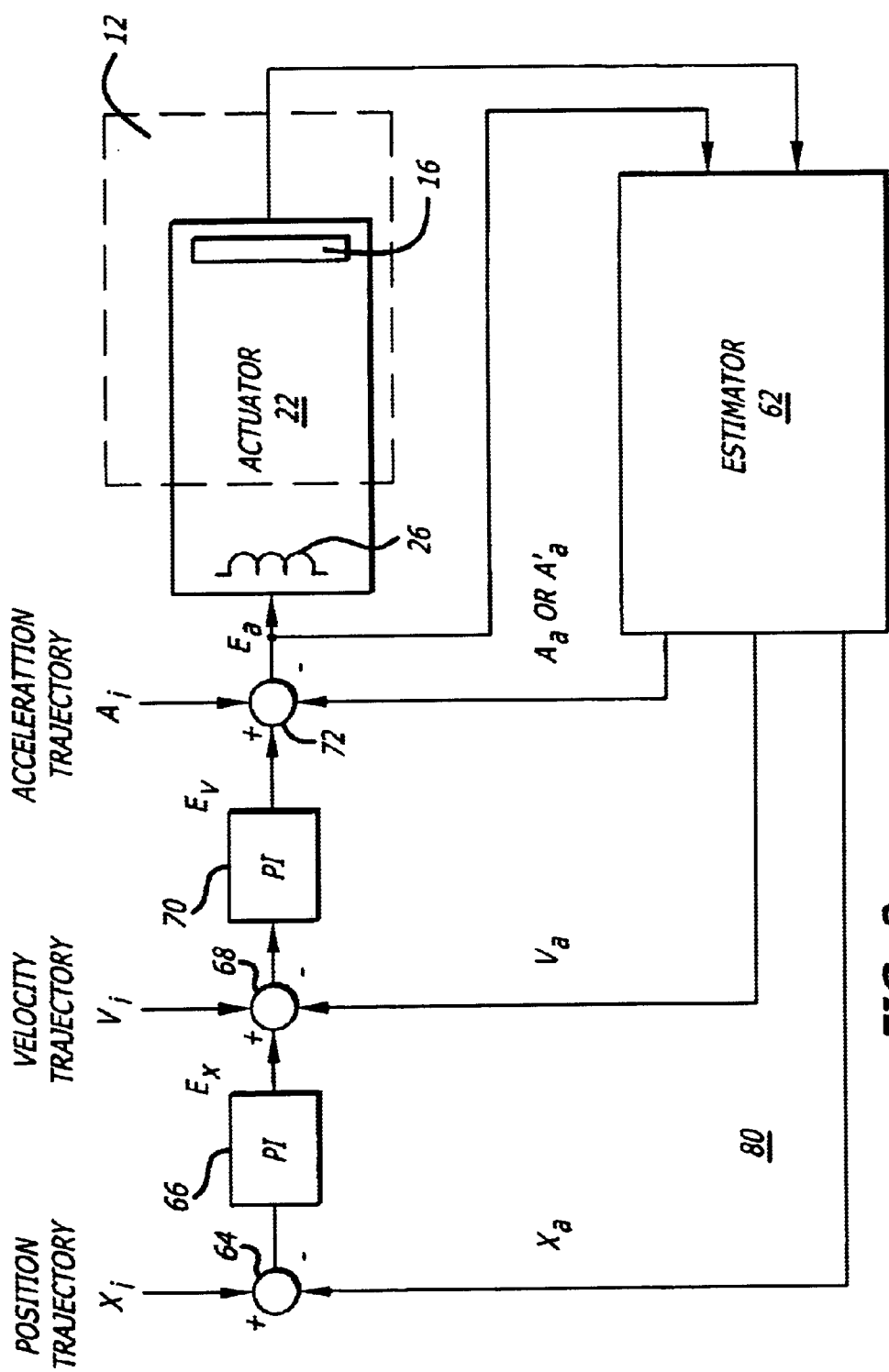
FIG. 3 is a schematic of a servo control system of the disk drive.

FIG. 3 shows a servo control system 60 that is implemented by the controller 42, which may be implemented in hardware and/or software. The servo control system 60 insures that the transducer 16 is accurately located on a desired track of the disk 12. When the controller 42 performs a seek routine the transducer 16 is moved from a first track to a new track located a distance $X_{SK}$ from the first track. The Gray codes of one or more tracks located between the new and first tracks are read as the transducer 16 moves across the disk 16. This allows the controller 42 to periodically determine whether the transducer 16 is moving at a desired speed or acceleration, or both, across the disk surface.

The control system 60 includes an estimator 62, which may be implemented in software and/or hardware. The estimator 62 can determine the actual distance or position $X_a$ that the transducer has moved from the first track. The position can be determined by reading the Gray code of a track beneath the transducer 16. The estimator 62 can also determine the actual velocity $V_a$ and actual acceleration $A_a$ of the transducer 16. The Gray codes can be periodically sampled as the transducer 16 moves to the new track location so that the controller 42 can correct the movement of the transducer 16 with the control system 60.

The controller 42 computes a design position $X_i$, a design velocity $V_i$ and a design acceleration $A_i$ of the transducer 16 each time the transducer reads the Gray code of a track 34. The controller 42 computes the difference between the design position $X_i$ and the actual position $X_a$ at summing junction 64. In block 66, the controller 42 then computes a position correction value $E_x$ with a proportional plus integral control algorithm and the output of the summing junction 64.

The actual velocity $V_a$ is subtracted from the sum of the design velocity $V_i$ and the position correction value $E_x$ at summing junction 68. In block 70, the controller 42 computes a velocity correction value $E_v$ with a proportional plus integral control algorithm and the output of the summing junction 68.

An acceleration correction value $E_a$ is computed by subtracting the actual acceleration $A_a$ from the sum of the design acceleration $A_i$ and the velocity correction value $E_v$ at summing junction 72. The acceleration correction value $E_a$ is used to increase or decrease the current provided to the voice coil 26 and to vary the acceleration of the movement of the transducer 16.

The acceleration correction value $E_a$ may also be provided to the estimator 62 to generate a feedforward acceleration value $A'_a$. The feedforward acceleration value $A'_a$ can be provided to sunning junction 72 to provide a feedforward control loop.

The design acceleration $A_i$, velocity $V_i$, and position $X_i$ waveforms provided at the respective summing junction 72, 68, and 64 are described and shown below.

In one embodiment, the acceleration trajectory comprises a sinusoidal acceleration trajectory, as defined by the following equation:

$$a(t) = K_A I_M \sin\left(\frac{2\pi}{T_{SK}}t\right), \qquad (1)$$

where;

$K_A$=acceleration constant;

$I_M$=maximum current provided to the voice coil; and $T_{SK}$=seek time required to move the transducer from the old track to the new track.

The following ideal velocity equation can be derived by integrating the acceleration equation.

$$v(t) = \int_o^t a(t)dt = K_A I_M \frac{T_{SK}}{2\pi}\left[1 - \cos\left(\frac{2\pi}{T_{SK}}t\right)\right]. \qquad (2)$$

Additionally, the following ideal position equation can be derived by integrating the velocity equation.

$$x(t) = \int_o^t v(t)dt = K_A I_M \frac{T_{SK}}{2\pi}\left[t - \frac{T_{SK}}{2\pi}\sin\left(\frac{2\pi}{T_{SK}}t\right)\right]. \qquad (3)$$

Figure 4A:
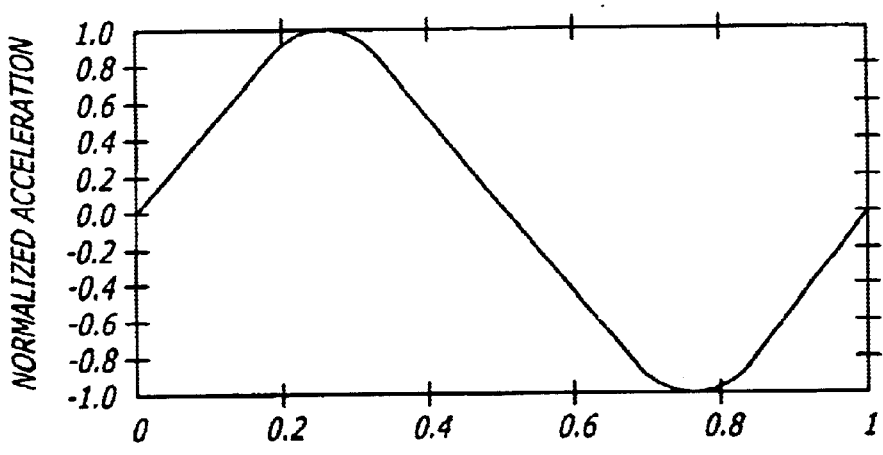
FIGS. 4A through 4C show exemplary graphs of the acceleration, velocity, and position trajectories of a sinusoidal seek.
Figure 4B:
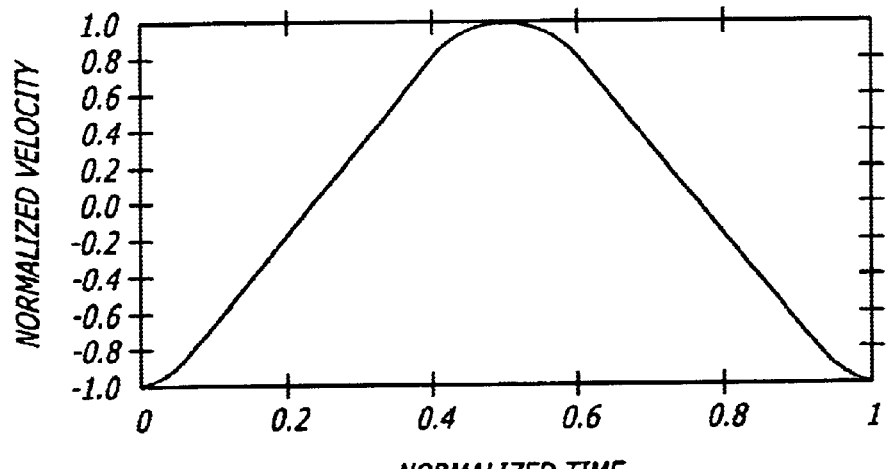
Figure 4C:
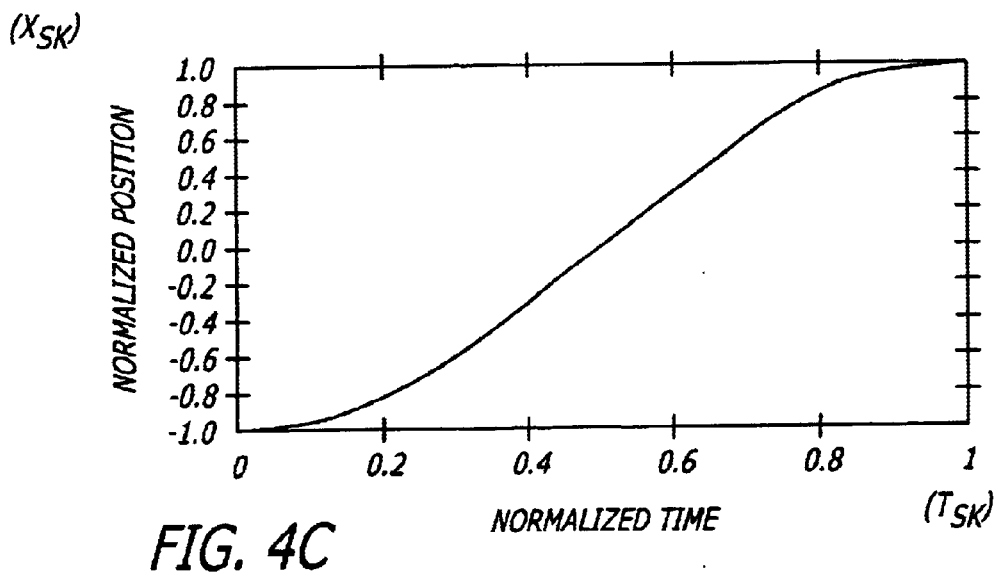

FIGS. 4A through 4C show exemplary graphs of the acceleration, velocity, and position trajectories of a sinusoidal seek. When the disk drive is in operation, the disk drive may receive a command to store or read information. The command may require that the transducer be moved from a first track to a new track in accordance with a seek routine. During a seek routine, the new track and corresponding distance (seek length $X_{SK}$) to the new track from the first track can be determined by the controller 42. The seek time may be initially computed before the ideal acceleration, ideal velocity, and ideal position are computed. The following relationship between $T_{SK}$ and $X_{SK}$ can be generated from equation (3) by setting $t=T_{SK}$.

$$T_{SK} = \sqrt{\frac{2\pi X_{SK}}{K_A I_M}}. \tag{4}$$

Instead of performing a square root operation, the controller can compute $T_{SK}$ from $X_{SK}$ by generating a number of sample points N between $t=0$ and $t=T_{SK}$ and storing the samples in a lookup table having N entries, and using the following linear interpolation algorithm to determine the seek time between sample points.

$$T_{SK} = T_{SK}^I + \frac{T_{SK}^{I+1} - T_{SK}^I}{X_{SK}^{I+1} - X_{SK}^I}(X_{SK} - X_{SK}^I). \tag{5}$$

Table 1 provides an exemplary format of the $X_{sk}$ v. $T_{sk}$ lookup table.

TABLE 1

| I | 1 | 2 | 3 | ... | N |
|---|---|---|---|-----|---|
| $X_{sk}$ | $X_{sk1}$ | $X_{sk2}$ | $X_{sk3}$ | ... | $X_{skN}$ |
| $T_{sk}$ | $T_{sk1}$ | $T_{sk2}$ | $T_{sk3}$ | ... | $T_{skN}$ |

During the servo routine, the system may take a number of samples which correlate to the different positions, velocities, and accelerations of the transducer as the transducer moves from one track to another track. It is desirable to discretize the ideal trajectories to correspond with the sampling of Gray codes so that the actual values can be subtracted from the ideal values at the summing junctions of the servo control shown in FIG. 3. To discretize the trajectories, equations (1), (2), and (3) are transformed into a sample domain (n) and equation (4) is substituted into the amplitude terms to generate the following equations.

$$a(n) = \frac{2\pi X_{SK}}{N_{SK}^2 T_{SM}^2}\sin\left(\frac{2\pi}{N_{SK}}n\right), \tag{6}$$

$$v(n) = \frac{X_{SK}}{N_{SK} T_{SM}}\left[1 - \cos\left(\frac{2\pi}{N_{SK}}n\right)\right], \text{ and} \tag{7}$$

$$x(n) = \frac{X_{SK}}{N_{SK}}n - \frac{X_{SK}}{2\pi}\sin\left(\frac{2\pi}{N_{SK}}n\right), \tag{8}$$

where;

$T_{sm}$=the sampling time, computed from equation (5);

$N_{SK}$=the total number of samples; and n=sample number.

The sine and cosine values can be computed by utilizing look-up tables that are stored in memory. Alternatively, the sine and cosine values can be computed with the state equation and initial value of the following recursive sine wave generation algorithm.

$$\begin{bmatrix} x_c(n+1) \\ x_s(n+1) \end{bmatrix} = \begin{bmatrix} \cos\left(\frac{2\pi}{N_{SK}}\right) & -\sin\left(\frac{2\pi}{N_{SK}}\right) \\ \sin\left(\frac{2\pi}{N_{SK}}\right) & \cos\left(\frac{2\pi}{N_{SK}}\right) \end{bmatrix}\begin{bmatrix} x_c(n) \\ x_s(n) \end{bmatrix}, \begin{bmatrix} x_c(0) \\ x_s(0) \end{bmatrix} = \begin{bmatrix} M \\ 0 \end{bmatrix}, \tag{9}$$

which utilizes the following known trigonometric identities.

$$\cos\left(\frac{2\pi}{N_{SK}}(n+1)\right) = \tag{10}$$

$$\cos\left(\frac{2\pi}{N_{SK}}\right)\cos\left(\frac{2\pi}{N_{SK}}n\right) - \sin\left(\frac{2\pi}{N_{SK}}\right)\sin\left(\frac{2\pi}{N_{SK}}n\right), \text{ and}$$

$$\sin\left(\frac{2\pi}{N_{SK}}(n+1)\right) = \sin\left(\frac{2\pi}{N_{SK}}\right)\cos\left(\frac{2\pi}{N_{SK}}n\right) - \cos\left(\frac{2\pi}{N_{SK}}\right)\sin\left(\frac{2\pi}{N_{SK}}n\right). \tag{11}$$

During the servo routine, the controller 42 computes the ideal position, ideal velocity, and ideal acceleration of the transducer at a first sample time, determines the actual position, velocity, and acceleration values and then processes the data in accordance with the control loop shown in FIG. 3 and described above. Second, third, etc. samples are taken and the process is repeated to provide a servo routine that controls the movement of the transducer 16.

The velocity of the transducer should not exceed a maximum value so that the transducer can accurately read Gray codes from the disk. From equation (2) the maximum velocity can be computed as follows:

$$V_{MAX} = K_A I_M \frac{T_{SK}}{\pi}. \tag{12}$$

Using equation (4) the maximum seek time and maximum seek length can be determined as follows.

$$T_{SK}^M = \frac{\pi}{K_A I_M}V_{MAX}, \text{ and} \tag{13}$$

$$X_{SK}^M = \frac{\pi}{2K_A I_M}V_{MAX}^2. \tag{14}$$

When the seek length $X_{SK}$ exceeds the maximum seek length $X_{SK}^M$, a coast period must be introduced where the acceleration of the transducer is zero, so that the transducer velocity does not exceed the maximum value. The coast time can be defined by the following equation.

$$T_{CST} = \frac{X_{SK} - X_{SK}^M}{V_{MAX}}. \tag{15}$$

For a seek length greater than $X_{SK}^M$ the ideal position, ideal velocity, and ideal acceleration trajectories may be defined in (n) domain by the following equations.

$$a(n) = \frac{2\pi 2X_{ACC}}{N_{SK}^{M2} T_{SM}^2}\sin\left(\frac{2\pi}{N_{SK}^M}n\right), \tag{16}$$

$$v(n) = \frac{2X_{ACC}}{N_{SK}^M T_{SM}}\left[1 - \cos\left(\frac{2\pi}{N_{SK}^M}n\right)\right], \text{ and} \tag{17}$$

$$x(n) = \frac{2X_{ACC}}{N_{SK}^M}n - \frac{2X_{ACC}}{2\pi}\sin\left(\frac{2\pi}{N_{SK}^M}n\right) \tag{18}$$

when the transducer is accelerating;

$$a(n)=0, \quad (19)$$

$$V(n) \, V_{MAX}, \text{ and} \quad (20)$$

$$x(n)=X_{ACC}+V_{MAX}T_{SM}(n-N_{SK}{}^M/2) \quad (21)$$

when the transducer is coasting; and $$a(n) = \frac{2\pi 2 X_{DEC}}{N_{SK}^{M2} T_{SM}^2} \sin\left(\frac{2\pi}{N_{SK}^M}(n - N_{CST})\right), \quad (22)$$

$$v(n) = \frac{2X_{DEC}}{N_{SK}^M T_{SM}}\left[1 - \cos\left(\frac{2\pi}{N_{SK}^M}(n - N_{CST})\right)\right], \text{ and} \quad (23)$$

$$x(n) = X_{ACC} + X_{CST} + \frac{2X_{DEC}}{N_{SK}^M}(n - N_{CST} - N_{SK}^M/2) - \frac{2X_{DEC}}{2\pi} \sin\left(\frac{2\pi}{N_{SK}^M}(n - N_{CST})\right) \quad (24)$$

when the transducer is decelerating
where;

$$X_{CST}=T_{CST}V_{MAX} \text{ for } T_{CST} \text{ at coast phase}, \quad (25)$$

$$X_{ACC}=(X_{SK}-X_{CST})/2 \text{ for } T_{SK}{}^M/2 \text{ at acceleration phase, and} \quad (26)$$

$$X_{DEC}=X_{SK}-X_{ACC}-X_{CST} \text{ for } T_{SK}{}^M/2 \text{ at deceleration phase}. \quad (27)$$

When the seek length exceeds $X_{SK}{}^M$, the controller computes the ideal position, ideal velocity, and ideal acceleration in accordance with equations (15) through (27), and then utilizes the ideal values in the control loop of FIG. 3.

During normal operation, the disk drive exhibits good seek performance using the sinusoidal seek method. In extreme conditions, however, such as, for example, when the disk drive is subjected to high temperature or is operated in a low voltage environment, the disk drive may exhibit a seek overrun condition. For example, at high temperatures, the resistance of the voice coil motor tends to increase causing a larger voltage drop across the voice coil motor, and thus a smaller voltage to drive the obtained current command $E_a$. As a result, a voltage saturation condition arises resulting in a different VCM current from the current command $E_a$. This can cause overshoot during settling.

Figure 5:
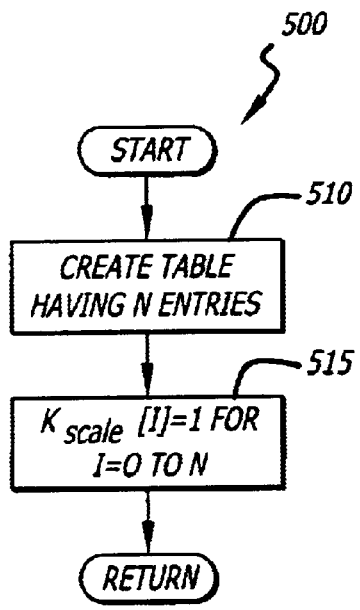
FIG. 5 illustrates a flow diagram of an initialization method, according to one embodiment of the present invention.
Figure 7:
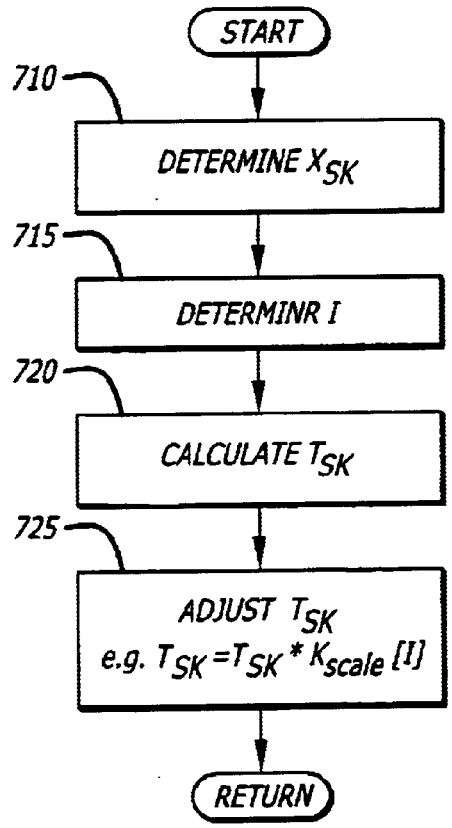
FIG. 7 illustrates a flow diagram of a method 700 for adjusting the seek time based on the scaling value, according to one embodiment of the present invention.
Figure 6:
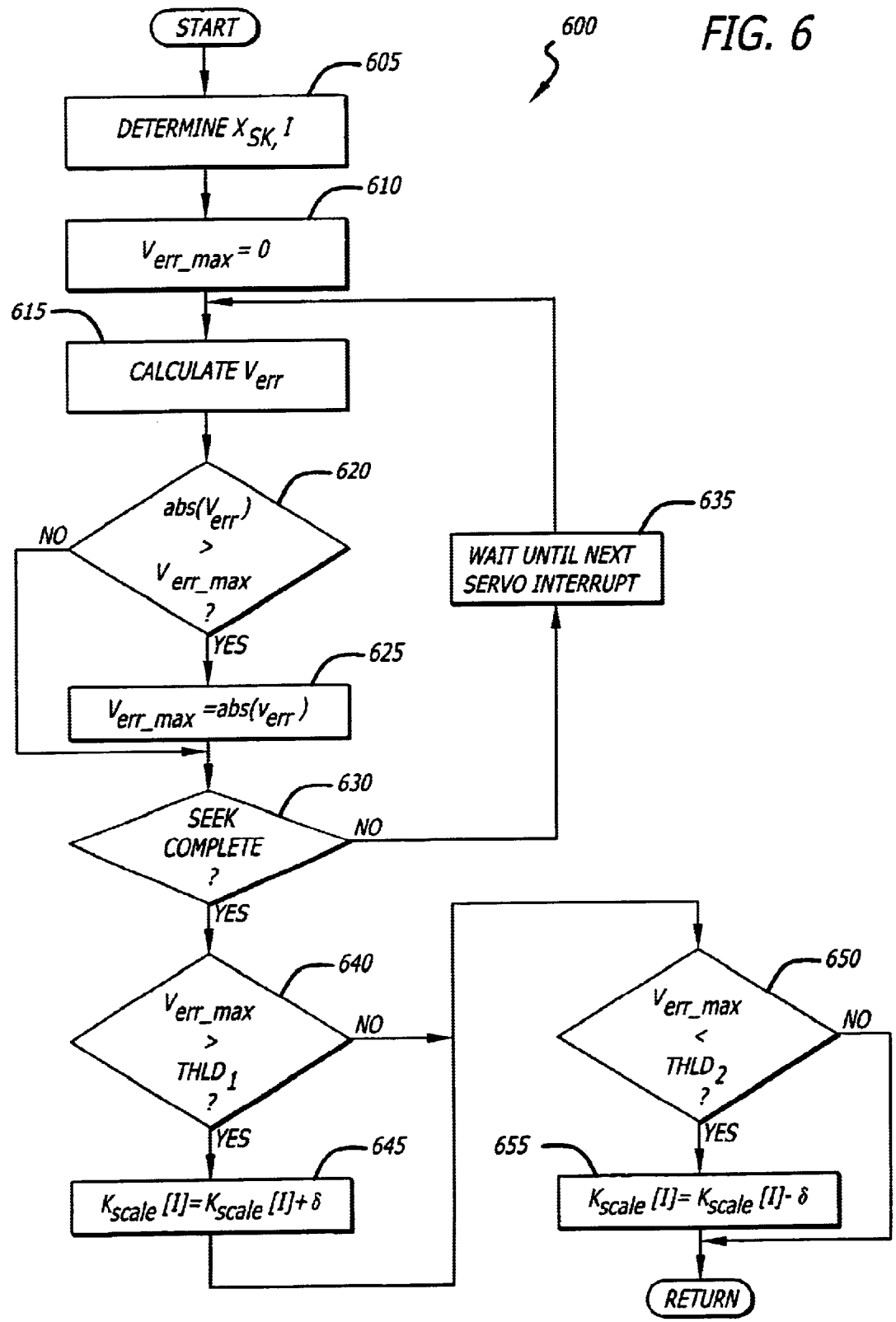
FIG. 6 illustrates a flow diagram of a method for adjusting a scaling value, according to one embodiment of the present invention.

To obtain stable seek performance both at normal and extreme conditions, the present invention adaptively adjusts the seek time based on the available voltage. Since the available voltage may be hard to determine, the seek time is adaptively adjusted based on the voltage error signal $V_{err}$. If there is sufficient voltage to drive the VCM, the VCM current is substantially the same as the current command $E_a$. In this case, the actual velocity is substantially the same as the velocity profile calculated from the current command. Consequently, the maximum of velocity error $V_{err}$ between the actual velocity and design velocity will be below a selectable threshold $THLD_1$. However, if there is not sufficient voltage to drive the VCM, the actual VCM current is different than the design current, and the actual velocity is different than the design velocity. Thus, if the maximum of velocity error $V_{err}$ during a seek operation is greater than the threshold $THLD_1$, it can be concluded that there is not sufficient voltage to drive the VCM. To compensate for the lack of sufficient voltage to drive the VCM, the seek time $T_{SK}$ is increased, resulting in a smaller current command for the seek length in the next seek operation. FIGS. 5 through 7 illustrate an exemplary embodiment of this mechanism.

FIG. 5 illustrates a flow diagram of an initialization method 500, according to one embodiment of the present invention. The initialization method is typically executed during power on self-test, or at some time prior to operation of the adaptive technique. Referring to FIG. 5, the method 500 commences at block 510 where a $K_{scale}$ table having N entries is created in memory (e.g., memory 52, FIG. 2). The size of the $K_{scale}$ table is equal to the size of Table 1. At block 515, all entries in the $K_{scale}$ table are set to one. In one embodiment, the $K_{scale}$ table may be part of Table 1.

FIG. 6 illustrates a flow diagram of a method 600 for adjusting a scaling value, according to one embodiment of the present invention. In one embodiment, the method 600 is executed for each seek. In this method, the maximum velocity error $V_{err}$ is calculated and compared with two thresholds. If $V_{err}$ is larger than a first threshold $THLD_1$, $K_{scale}$ is increased to provide a slower seek time. On the other hand, if $V_{err}$ is smaller than a second threshold $THLD_2$, $K_{scale}$ is decreased to provide faster seek time.

Referring to FIG. 6, the method 600 commences at block 605 where $X_{sk}$ and I are determined. $X_{sk}$, which is the distance between a current track and a new track, may be determined by table lookup. Once $X_{sk}$ is determined, I is determined from Table 1. For example, if $X_{sk}$ is equal to the fifth entry in Table 1 ($X_{sk5}$), then I is equal to five. If, on the other hand, $X_{sk}$ is at a value between two entries (e.g., between $X_{sk20}$ and $X_{sk21}$), then I may be set to either entry (e.g., twenty or twenty-one). The method 600 continues to block 610 where a variable $V_{err\_max}$ is initialized to zero. At block 615, at a first sample time during the seek, the velocity error $V_{err}$, which is the output of summing junction 68, is calculated. The method 600 then moves to block 620 where the absolute value of $V_{err}$ ($ABS(V_{err})$) is compared to $V_{err\_max}$. If $ABS(V_{err})$ is greater than $V_{err\_max}$, then the method continues to block 625 where $V_{err\_max}$ is set to the $ABS(V_{err})$, otherwise the process skips block 625. At block 630, the method 600 determines whether the seek is complete. If so, the process continues to block 640. If not, the process moves to block 635, where the method waits for the next servo interrupt at the next sample time. Blocks 615, 620, and/or 625 are executed for each sample time until the seek is complete, at which time the highest value of the velocity error is stored in $V_{err\_max}$.

Continuing with FIG. 6, at block 640, $V_{err\_max}$ is compared to a first predetermined threshold $THLD_1$. This block determined whether the highest value of the velocity error is above a predetermined value. The predetermined threshold may be set to any value or range of values. The predetermined threshold $THLD_1$ may be a number or a percentage. For example, the predetermined threshold may be 5%, 10%, 15%, or higher. The predetermined threshold may be set to a lower value or percentage. Thus, during a seek, if the biggest different between an actual velocity and ideal velocity is less than the predetermined threshold (e.g., 10%), the process moves to block 650. Otherwise, the process moves to block 645 where the I-th element in the $K_{scale}$ table is increased by a predetermined value δ. This new value will be used to increase the seek time $T_{SK}$ during the next seek that has the same seek length (for the same entry I in Table 1). The designer may set the value and/or granularity of δ. For example, the seek time may be increased by 1%, 5%, 10%, or higher.

The process continues to block 650 where $V_{err\_max}$ is compared to a second predetermined threshold $THLD_2$. That is, if the highest value of the velocity error during the seek is below a second predetermined threshold, indicating that the seek time can be decreased while still maintaining stable seek performance, the I-th element in the $K_{scale}$ table is decreased by α (block 655). The value α may be equal to δ.

It is to be noted that variations to the method 600 exist. For example, instead of storing the highest value of $V_{err}$ as $V_{err\_max}$, the average of $V_{err}$ for all sample times during a seek may be stored as $V_{err\_avg}$. Moreover, $V_{err}$ or $V_{err\_avg}$ can be compared to more than one threshold level. For example, if $V_{err}$ or $V_{err\_avg}$ is greater than a first threshold $THLD_{1A}$ but smaller than a second threshold $THLD_{1B}$, the entry in the $K_{scale}$ table can be increased by a first amount $\delta_1$, and if $V_{err}$ or $V_{err\_avg}$ is greater than the second threshold $THLD_{1B}$ but smaller than a third threshold $THLD_{1C}$, the entry in the $K_{scale}$ table can be increased by a second, larger amount $\delta_2$ and so on. A similar mechanism may be used for the second threshold $THLD_2$.

FIG. 7 illustrates a flow diagram of a method 700 for adjusting the seek time, according to one embodiment of the present invention. The method 700 is executed prior to calculation of the ideal position, velocity, and acceleration trajectories, and prior to the current command $E_a$.

Referring to FIG. 7, the method 700 commences at block 710, where the distance $X_{sk}$ between the current track and new track is determined. This may be determined by searching a lookup table. At block 715, the value of I is determined using Table 1 (lookup table). At block 720, $T_{sk}$ is determined by matching $T_{sk}$ to $X_{sk}$ in Table 1, and using linear interpolation (Equation 5), if necessary. At block 725, $T_{sk}$ is adjusted. In one embodiment, $T_{sk}$ is adjusted by multiplying $T_{sk}$ by $K_{scale}[I]$, the I-th entry in the $K_{scale}$ table. If the value of $K_{scale}[I]$ is greater than 1, indicating insufficient voltage to drive the VCM for the seek length of $X_{sk}$, then $T_{sk}$ is increased; if the value of $K_{scale}[I]$ is equal to one, indicating sufficient voltage to drive the VCM for the seek length of $X_{sk}$, then $T_{sk}$ is unchanged; and if $K_{scale}[I]$ is less than one, indicating that additional voltage is available to drive the VCM, $T_{sk}$ is decreased.

As can be seen, the present invention provides a method and apparatus for adaptively adjusting seek trajectories based on voltage available to drive the voice coil motor. During a seek, if the highest value of the velocity error, which indicates the difference between the ideal velocity and actual velocity, is greater than a predetermined threshold, it can be safely assumed that there is not sufficient voltage to drive the voice coil motor. As a result, the seek time is increased to cause a smaller current command for the same seek length in the next seek operation. This reduces the possibility of a seek overrun. The present invention may be implemented in any sinusoidal seek hard disk drive servo-mechanisms such as those described in co-pending applications having application Ser. No. 09/552,112, entitled GENERALIED FOURIER SEEK METHOD AND APPARATUS FOR A HARD DISK DRIVE SERVOMECHANISM, and application Ser. No. 09/609,630, entitled AN OPTIMIZATION METHOD AND APPARATUS FOR A GENERALIZED FOURIER SEEK TRAJECTORY FOR A HARD DISK DRIVE SERVOMECHANISM, the contents of which are fully incorporated herein by reference.

The present invention may be implemented as a method, apparatus, system, computer program product, etc. When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
   a disk which has a surface;
   a spindle motor to rotate said disk;
   a transducer to write information onto and read information from said disk;
   an actuator arm to move said transducer across said surface of said disk; and
   a controller, in response to a command to seek from a first track to a second track, to determine a seek length from the first track to the second track, determine a seek time for the seek based on the seek length, scale the seek time in response to a velocity error between a calculated velocity and a design velocity for the seek length, and control the actuator arm to move said transducer across said disk surface from the first track to the second track using an acceleration trajectory, said controller varies the seek time with a predetermined scaling amount if a velocity error calculated during a previous seek passes a predetermined threshold value.

2. The hard disk drive of claim 1, wherein said controller increases the seek time by the predetermined scaling amount if the velocity error calculated during the previous seek for the seek length is greater than the predetermined threshold value.

3. The hard disk drive of claim 2, wherein said predetermined scaling amount is between the range of 0.01 percent to 50 percent.

4. The hard disk drive of claim 2, wherein said predetermined threshold value is a percentage and is between 0.1 percent to 30 percent.

5. The hard disk drive of claim 2, wherein said controller to increase the seek time by the predetermined scaling amount if a maximum of the velocity error calculated during a sample time of the previous seek for the seek length is greater than the predetermined threshold value.

6. The hard disk drive of claim 1, wherein said controller decreases the seek time by the predetermined scaling amount if the velocity error calculated during the previous seek for the seek length is less than the predetermined threshold value.

7. The hard disk drive of claim 6, wherein said predetermined scaling amount is between the range of 0.01 percent to 50 percent, and wherein said predetermined threshold value is a percentage and is between 0.1 percent to 30 percent.

8. The hard disk drive of claim 6, wherein said controller decreases the seek time by the predetermined scaling amount if a maximum of the velocity error calculated during a sample time of the previous seek for the seek length is less than the predetermined threshold value.

9. The hard disk drive of claim 1, wherein said controller to move said transducer across said disk surface from the first track to the second track using an essentially sinusoidal acceleration trajectory.

10. The hard disk drive of claim 1, wherein said controller is a digital signal processor.

11. The hard disk drive of claim 1, wherein said controller to scale the seek time by one if the velocity error calculated during a previous seek for the seek length is greater than a lower threshold value and less than a higher threshold value.

12. A method for moving a transducer across a surface of a disk, comprising:
   determining a seek length between a current track and a new track for a current seek;
   determining a seek time for moving the transducer from the current track to the new track;
   adjusting the seek time in response to a velocity error between a calculated velocity and a design velocity for the seek length;
   exciting an actuator arm that is coupled to the transducer to move the transducer across said disk surface from the current track to the new track using an acceleration trajectory based on the seek length and seek time;
   calculating a velocity error for the previous seek;
   varying the seek time with a scaling amount if the velocity error passes a predetermined threshold value; and
   exciting the actuator arm based on the varied scaling amount.

13. The method of claim 12, wherein the seek time is increased by the scaling amount if the velocity error calculated during the previous seek for the seek length is greater than a predetermined threshold value.

14. The method of claim 13, wherein increasing the seek time by the scaling amount if the velocity error calculated during the previous seek for the seek length is greater than the predetermined threshold value comprises increasing the seek time by an amount within a range of 0.01 percent to 50 percent if the velocity error calculated during a previous seek for the seek length is greater than the predetermined threshold value.

15. The method of claim 13, wherein increasing the seek time by the scaling amount if the velocity error calculated during the previous seek for the seek length is greater than the predetermined threshold value comprises increasing the seek time by the scaling amount if the velocity error calculated during the previous seek for the seek length is greater than a percentage between 0.1 percent to 30 percent.

16. The method of claim 13, wherein increasing the seek time by the scaling amount if the velocity error calculated during a previous seek for the seek length is greater than the predetermined threshold value comprises increasing the seek time by the scaling amount if a maximum of the velocity error calculated during a plurality of sample times of the previous seek for the seek length is greater than the predetermined threshold value.

17. The method of claim 12, wherein the seek time is decreased by the scaling amount if the velocity error calculated during a previous seek for the seek length is less than a predetermined threshold value.

18. The method of claim 17, wherein decreasing the seek time by the scaling amount if the velocity error calculated during the previous seek for the seek length is less than the predetermined threshold value comprises decreasing the seek time by a value between the range of 0.01 percent to 50 percent if the velocity error calculated during the previous seek for the seek length is less than a percentage between 0.1 percent to 30 percent.

19. The method of claim 17, wherein decreasing the seek time by the scaling amount if the velocity error calculated during the previous seek for the seek length is less than the predetermined threshold value comprises decreasing the seek time by the scaling amount if a maximum of the velocity error calculated during a plurality of sample times of the previous seek for the seek length is less than the predetermined threshold value.

20. The method of claim 12, wherein exciting comprises exciting the actuator arm that is coupled to the transducer to move the transducer across said disk surface from the first track to the second track using an essentially sinusoidal acceleration trajectory based on the seek length and seek time.

21. The method of claim 12, wherein adjusting the seek time, if necessary, in response to the velocity error between the calculated velocity and the design velocity for the seek length comprises adjusting the seek time by one or preventing the seek time from being adjusted if the velocity error calculated during a previous seek for the seek length is below a high threshold value and above a low threshold value.

22. The method of claim 12, wherein determining the seek time for moving the transducer from the current track to the new track comprises determining the seek time for moving the transducer from the current track to the new track using a seek length versus seek time look up table, and, if necessary, a linear interpolation algorithm.

23. A computer program product, comprising:
   a computer usable medium having computer readable program code embodied therein to move a transducer attached to an actuator arm across a surface of a disk in a hard disk drive, the computer readable program code in said computer program product comprising:
   first computer readable program code to determine a seek length between a first track and a second track for a current seek;
   second computer readable program code to determine a seek time for moving the transducer from the current track to the new track;
   third computer readable program code to adjust the seek time, if necessary, in response to an amount of voltage available to drive the actuator arm;
   fourth computer readable program code to excite the actuator arm to move the transducer across said disk surface from the first track to the second track using an acceleration trajectory based on the seek length and seek time; and
   fifth computer readable program code that varies the seek time with a predetermined scaling amount if a velocity error calculated during a previous seek passes a predetermined threshold value.

24. The computer program product of claim 23, wherein said fifth computer readable program code increases the seek time by the predetermined amount if the velocity error, which is a difference between a calculated velocity and a design velocity, calculated during the previous seek for the seek length is greater than the predetermined threshold value.

25. The computer program product of claim 24, wherein said fifth computer readable program code comprises third computer readable program code to increase the seek time by an amount within a range of 0.01 percent to 50 percent if the velocity error calculated during the previous seek for the seek length is greater than the predetermined threshold value.

26. The computer program product of claim 24, wherein said fifth computer readable program code comprises third computer readable program code to increase the seek time by the predetermined amount if the velocity error calculated during the previous seek for the seek length is greater than a percentage between 0.1 percent to 30 percent.

27. The computer program product of claim 24, wherein said fifth computer readable program code comprises third computer readable program code to increase the seek time by the predetermined amount if a maximum of the velocity error calculated during a plurality of sample times of the previous seek for the seek length is greater than the predetermined threshold value.

28. The computer program product of claim 23, wherein said fifth computer readable program code decreases the seek time by the predetermined amount if a velocity error, which is a difference between a calculated velocity and a design velocity, calculated during the previous seek for the seek length is less than the predetermined threshold value.

29. The computer program product of claim 28, wherein said fifth computer readable program code decreases the seek time by a value between the range of 0.01 percent to 50 percent if the velocity error calculated during the previous seek for the seek length is less than a percentage between 0.1 percent to 30 percent.

30. The computer program product of claim 28, wherein said fifth computer readable program code decreases the seek time by the predetermined amount if a maximum of the velocity error calculated during a plurality of sample times of the previous seek for the seek length is less than the predetermined threshold value.

31. The computer program product of claim 23, wherein said fourth computer readable program code comprises fourth computer readable program code to excite the actuator arm to move the transducer across said disk surface from the first track to the second track using an essentially sinusoidal acceleration trajectory based on the seek length and seek time.

32. The computer program product of claim 23, wherein said second computer readable program code comprises second computer readable program code to determine the seek time for moving the transducer from the current track to the new track using a seek length versus seek time look up table, and, if necessary, a linear interpolation algorithm.

33. A method for moving a transducer across a surface of a disk, comprising:

determining a seek length and a seek time for a current seek from a first track to a second track;

moving the transducer across the disk surface based on the seek length and seek time;

computing a design position of the transducer;

determining an actual position of the transducer;

generating a position correction value that is a function of the design position and the actual position;

computing a design velocity of the transducer;

determining an actual velocity of the transducer;

generating a velocity correction value that is a function of the design velocity, the actual velocity and the position correction value;

storing a scaling value in a memory in response to the velocity correction value, said scaling value for multiplying with the seek time to obtain a scaled seek time during a future seek of the seek length;

computing a design acceleration of the transducer using a generalized Fourier series seek acceleration trajectory that includes one or more tuned coefficients;

determining an actual acceleration of the transducer;

generating a feedforward acceleration value that is a function of the actual acceleration value;

generating an acceleration correction value that is a function of the velocity correction value, the feedforward acceleration value and the design acceleration; and, varying the movement of the transducer in response to the generation of the acceleration correction value.

34. The method of claim 33, wherein storing comprises storing a scaling value that is greater than one in the memory if the velocity correction value is greater than a predetermined threshold value.

35. The method of claim 34, wherein storing comprises storing the scaling value that is between 1.0001 and 1.5 in the memory if the velocity correction value is greater than the predetermined threshold value.

36. The method of claim 34, wherein storing comprises storing the scaling value that is greater than one in the memory if the velocity correction value is greater than a percentage between 0.1 percent to 30 percent.

37. The method of claim 33, wherein storing comprises storing a scaling value that is less than one in the memory if the velocity correction value is less than a predetermined threshold value.

38. The method of claim 37, wherein storing comprises storing a scaling value that is between 0.9999 and 0.5 in the memory if the velocity correction value is less than the predetermined threshold value.

39. The method of claim 33, wherein storing comprises storing a scaling value equal to one in the memory if the velocity correction value is less than a high threshold value and greater than a low threshold value.

* * * * *